Feb. 26, 1929.  
H. L. MacNEILL  
1,703,678  
RESETTING MECHANISM FOR ODOMETERS, ETC  
Filed Dec. 14, 1927  2 Sheets-Sheet 2
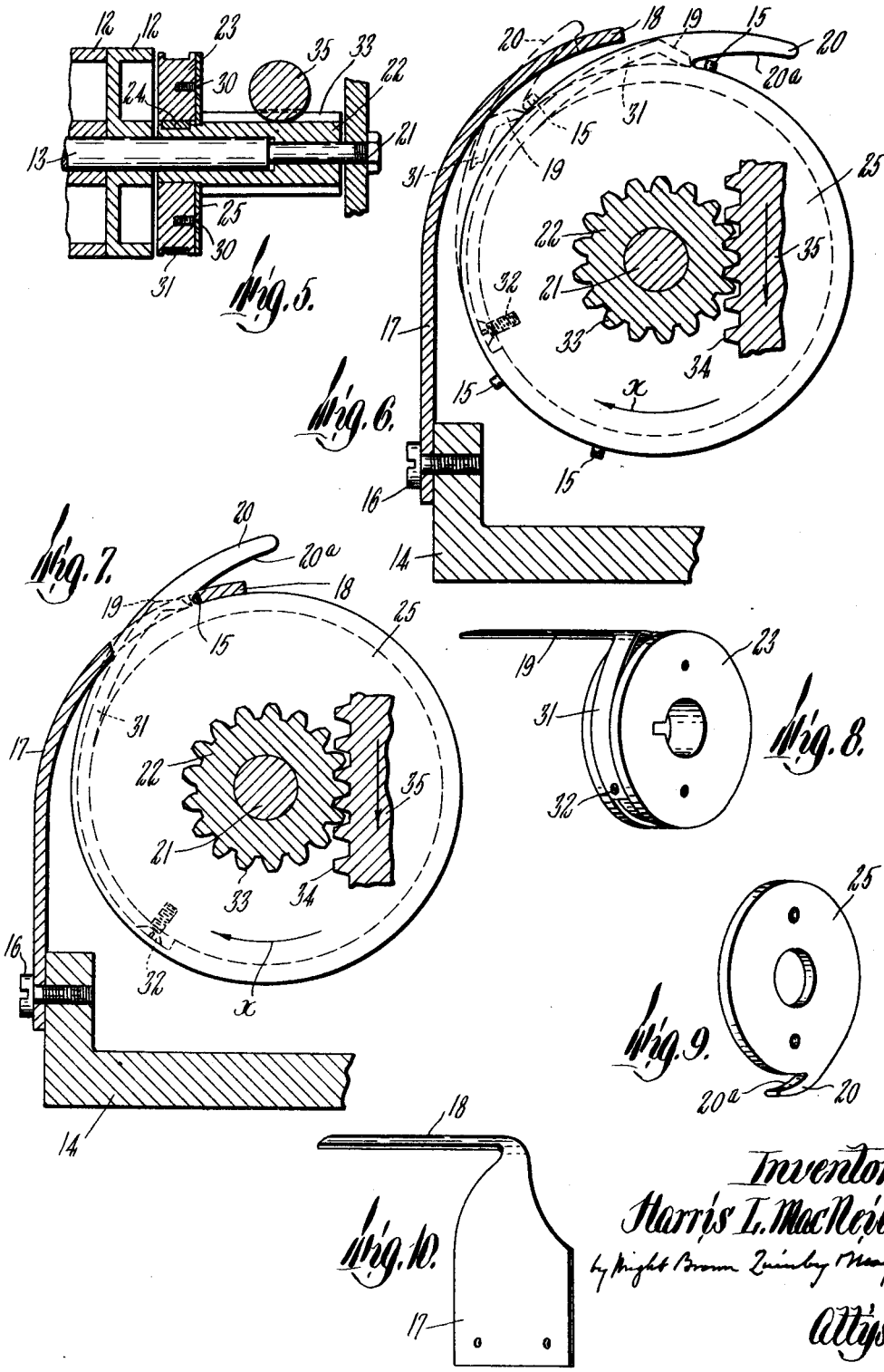
Inventor:  
Harris L. MacNeill,  
by Wright Brown Quinby Mary  
Attys.

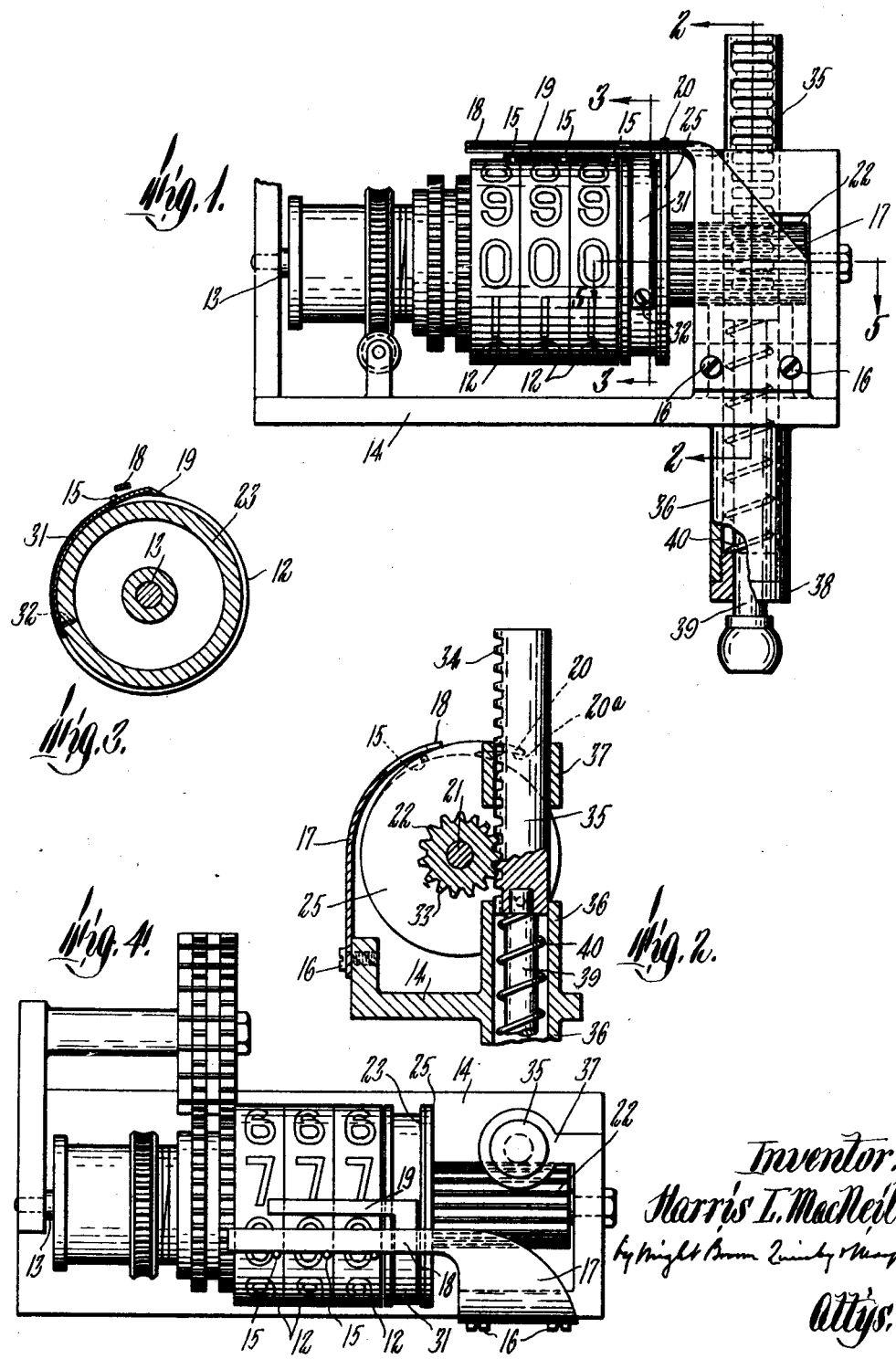

Patented Feb. 26, 1929.

1,703,678

UNITED STATES PATENT OFFICE.

HARRIS L. MacNEILL, OF WALTHAM, MASSACHUSETTS, ASSIGNOR TO WALTHAM WATCH COMPANY, OF WALTHAM, MASSACHUSETTS, A CORPORATION OF MASSACHUSETTS.

RESETTING MECHANISM FOR ODOMETERS, ETC.

Application filed December 14, 1927. Serial No. 239,951.

This invention relates to a registering instrument such as an odometer for motor vehicles, the instrument including a series of coaxial registering wheels, one of which, the primary wheel, is connected with a wheel of the vehicle to be rotated thereby, the other wheels being rotated step by step, through well known intermediate connections with the primary wheel, the second wheel being rotated one step by each complete rotation of the primary wheel, and each succeeding wheel being rotated one step by each complete rotation of the preceding wheel.

It is necessary to occasionally reset the wheels, or in other words, set them at their starting positions with all the numerals of the same value in alinement with each other, the zero numerals being arranged in a row parallel with the axis of the wheels, and the other numerals in rows parallel with the zero numerals.

The objects of the invention is to provide an improved mechanism whereby the wheels may be quickly reset, so that the instrument is prepared for another period of operation.

Of the accompanying drawings forming a part of this specification,—

Figure 1 is a side elevation, showing portions of an odometer structure including a series of registering wheels, and the resetting mechanism in which the invention is embodied.

Figure 2 is a section on line 2—2 of Figure 1.

Figure 3 shows in section, on the plane indicated by line 3—3 of Figure 1, parts of the resetting mechanism.

Figure 4 is a plan view, showing the structure shown by Figure 1.

Figure 5 is a fragmentary section on line 5—5 of Figure 1.

Figure 6 is an enlargement of portions of Figure 2, illustrating the operation of the stop hereinafter described.

Figure 7 is a view similar to Figure 6, illustrating the operation of the pawl hereinafter described.

Figure 8 is a perspective view, showing a member of the carrier hereinafter described, and the pawl carried thereby.

Figure 9 is a perspective view, showing the stop shifter detached from the carrier.

Figure 10 is a perspective view, showing the stop.

The same reference characters indicate the same parts in all of the figures.

The registering instrument shown in part by the drawings, includes the usual or any suitable series of registering wheels 12, which may be composed of any desired number, three being shown in this instance. The wheels are coaxially mounted and rotatable on a shaft 13, supported by a frame 14.

It is not necessary to describe the mechanism whereby the wheels are rotated, it being sufficient to say that the series includes a primary wheel at one end of the series, which may be rotated by any suitable connections between it and a driving member, such as a wheel of a motor vehicle, and connections between the primary wheel and the succeeding wheels, whereby the latter are rotated step by step, so that a registration of the mileage of the vehicle is effected by numerals on the peripheries of the wheels visible through a sight opening (not shown) in the casing.

It is to be understood that my invention hereinafter described relates wholly to resetting mechanism, whereby the wheels may be set and reset, so that only their zero numerals are visible through the sight opening at the commencement of a registering operation.

In carrying out my invention I provide the registering wheels 12 with teeth 15, there being one tooth on each wheel, and the teeth being so arranged relative to the wheel numerals that when the wheels are reset at zero the teeth are in alinement with each other and form a straight row extending parallel with the axis of the wheels.

To the frame I secure, as by screws 16, a resilient shank 17, from the free end of which an elongated stop 18 projects laterally over the series of wheels, the stop being normally held or located yieldingly by the resilience of the shank outside the path of the wheel teeth, as shown by Figures 2, 3 and 6, and shiftable inwardly into said path, as shown by Figure 7, so that it is adapted to arrest the teeth in alinement with each other.

19 designates an elongated pawl which is movable over the peripheries of the wheels 12, and engageable with the teeth 15, to move the teeth against the stop. 20 designates a stop shifter movable with the pawl 19, to shift the stop 18 into the path of the wheel teeth. The pawl and the stop shifter are fixed to a carrier, adapted to be moved, preferably in a curved path, to locate the shifter alternately in the inoperative position shown by Figure 6, and in the operative position shown by Figure 7. The carrier is preferably adapted to rock or oscillate on the shaft 13, and on an arbor 21 (Figure 5) supported by the frame in a position coaxial with the shaft, the carrier including a sleeve 22, and a collar 23, fixed as by a key 24 (Figure 5) to one end of the sleeve. The stop shifter 20 is formed on a plate 25, (Figure 9) fixed, as by screws 30, to the collar 23, the shifter being a finger having a stop-engaging inner face 20ᵃ arranged to force the stop 18 into the path of the wheel teeth, as shown by Figure 7. The pawl 19 is formed on the free end of a resilient shank 31, which is fixed, as by a screw 32, to the periphery of the collar 23. The pawl is inclined, as shown by Figures 6 and 7, so that it is adapted to yield to and be sprung outwardly by the wheel teeth 15, when the instrument is in operation and the pawl is in the inoperative position shown by Figure 6. When the pawl is moved to or toward the position shown by Figure 7, it engages and positively moves the wheel teeth in its path. The carrier is operable by operating means including a yielding element normally holding the carrier at one extreme of its movement, and a manually movable element adapted to move the carrier to the other extreme of its movement.

In the embodiment of the invention here shown, the rocking sleeve portion 22 of the carrier is provided externally with gear teeth 33, meshing with rack teeth 34, on a bar 35, which is movable vertically in a guide formed, in this instance, by tubular portions 36, 37, of the frame, the portion 36 having a spring abutment 38. The rack bar 35 is provided with a pull handle 39, whereby it may be manually moved in one direction. A spring 40, constituting the yielding element, is interposed between the abutment 38 and the rack bar, and normally supports the rack bar in the raised position shown by Figure 2. When the rack bar is in this position, the stop shifter 20 and pawl 19 are maintained yieldingly in the inoperative position shown by Figure 6.

When the instrument is performing its function, the carrier being in its inoperative position, the wheel teeth 15, which move in the direction indicated by the arrow X (Figure 6), displace the pawl 19 in passing under it, so that the resetting mechanism does not affect the usual operation of the instrument. When the wheels are to be reset after a period of operation, the operator pulls down on the handle 39, thus turning the carrier and moving the stop shifter 20 and the pawl 19 from the positions shown by Figure 6, to those shown by Figure 7, the stop 18 being thus shifted into the path of the wheel teeth 15, and caused to arrest the teeth which are engaged by the pawl, after the stop has been thus shifted.

I claim:

1. The combination with a registering instrument which includes a series of coaxial registering wheels, of a wheel-resetting mechanism comprising a series of teeth, one for each wheel, fixed to the wheels, the teeth being arranged to be in alinement with each other when the wheels are reset, an elongated stop yieldingly mounted on a fixed support and normally located outside the path of the wheel teeth, the stop being shiftable into said path to arrest the teeth in alinement with each other, an elongated pawl movable over the peripheries of the wheels and engageable with the wheel teeth to move the same against the stop, a stop shifter movable with the pawl to shift the stop into the path of the wheel teeth, an oscillatory carrier for said pawl and shifter, and carrier-operating means including a yielding element normally holding the carrier at one extreme of its movement, and a manually movable element adapted to move the carrier to the opposite extreme of its movement, the arrangement being such that when the carrier is in its normal position, the usual operation of the registering wheels is permitted, and when the carrier is moved to its opposite position, the stop is shifted into the path of the wheel teeth and the pawl is moved to cooperate with the teeth and stop in resetting the wheels.

2. The combination with a registering instrument which includes a series of coaxial registering wheels, of a wheel-resetting mechanism comprising a series of teeth, one for each wheel, fixed to the wheels, the teeth being arranged to be in alinement with each other when the wheels are reset, an elongated stop yieldingly mounted on a fixed support and normally located outside the path of the teeth, the stop being shiftable into said path to arrest the teeth when they are in alinement with each other, an oscillatory carrier movable about an axis in alinement with the axis of the wheels, and provided with an elongated pawl adapted to engage and aline the teeth, and with a stop shifter adapted to move the stop into the path of the wheel teeth, and carrier-operating means including a yielding element holding the carrier in a normal and inoperative position, and a manually movable element operable to turn the carrier to an abnormal and operative position, the arrangement being such that when the carrier is in its normal position, the usual operation of the registering wheels is permitted, and when the carrier is moved to its abnormal position, the stop is shifted into the path of the wheel teeth, and the pawl rotates the wheels to their starting position.

3. The combination with a registering instrument which includes a series of coaxial registering wheels, of a wheel-resetting mechanism comprising a series of teeth, one for each wheel, fixed to the wheels, the teeth being arranged to be in alinement with each other when the wheels are reset, an elongated stop yieldingly mounted on a fixed support and normally located outside the path of the teeth, the stop being shiftable into said path to arrest the teeth when they are in alinement with each other, a carrier composed of a sleeve movable about an axis coaxial with the axis of the wheels and provided with external gear teeth, and a collar fixed to the sleeve and provided with an elongated pawl adapted to engage and aline the teeth and with a stop shifter adapted to move the stop into the path of the wheel teeth, and carrier-operating means including a rack bar reciprocable in a fixed guide and engaging the sleeve teeth, and a spring normally supporting the rack bar at one extreme of its movement, the rack bar being manually movable to an abnormal position at the opposite extreme of its movement, the arrangement being such that when the rack bar is in its normal position, the usual operation of the registering wheels is permitted, and the manual movement of the rack bar to its abnormal position causes the shifter to move the stop into the path of the wheel teeth, and the pawl to engage said teeth and rotate the wheels simultaneously to their starting positions.

In testimony whereof I have affixed my signature.

HARRIS L. MacNEILL.